United States Patent
Karpuska

(10) Patent No.: US 12,273,319 B2
(45) Date of Patent: *Apr. 8, 2025

(54) OPTIMIZING COMMUNICATION BETWEEN MESHNET DEVICES IN A MESH NETWORK

(71) Applicant: UAB 360 IT, Vilnius (LT)

(72) Inventor: Rytis Karpuska, Vilnius (LT)

(73) Assignee: UAB 360 IT, Vilnius (LT)

( * ) Notice: Subject to any disclaimer, the term of this patent is extended or adjusted under 35 U.S.C. 154(b) by 57 days.

This patent is subject to a terminal disclaimer.

(21) Appl. No.: 18/202,258

(22) Filed: May 25, 2023

(65) Prior Publication Data
US 2024/0396868 A1 Nov. 28, 2024

Related U.S. Application Data

(63) Continuation of application No. 18/200,512, filed on May 22, 2023, now Pat. No. 11,811,726.

(51) Int. Cl.
| | |
|---|---|
| *H04L 12/70* | (2013.01) |
| *H04L 41/0806* | (2022.01) |
| *H04L 61/5038* | (2022.01) |
| *H04L 67/12* | (2022.01) |
| *H04W 48/08* | (2009.01) |

(52) U.S. Cl.
CPC .......... *H04L 61/5038* (2022.05); *H04L 67/12* (2013.01)

(58) Field of Classification Search
CPC ............................ H04L 61/5038; H04L 67/12
USPC ....................................................... 709/245
See application file for complete search history.

(56) References Cited

U.S. PATENT DOCUMENTS

| | | | | |
|---|---|---|---|---|
| 2006/0114881 | A1* | 6/2006 | Chari | H04W 88/04 370/351 |
| 2006/0268766 | A1* | 11/2006 | Rangarajan | H04W 8/26 370/406 |
| 2015/0127949 | A1 | 5/2015 | Patil et al. | |
| 2018/0213553 | A1* | 7/2018 | Boixadera Espax | H04W 74/085 |
| 2020/0336897 | A1* | 10/2020 | Ledvina | H04W 12/71 |
| 2021/0029031 | A1* | 1/2021 | Boutros | H04L 45/74 |
| 2021/0036986 | A1 | 2/2021 | Qi et al. | |
| 2021/0153100 | A1* | 5/2021 | Aksu | H04L 1/0026 |
| 2023/0232282 | A1* | 7/2023 | Belur Ramachandra | H04W 28/16 370/252 |

(Continued)

*Primary Examiner* — Ario Etienne
*Assistant Examiner* — Elizabeth Kassa
(74) *Attorney, Agent, or Firm* — The Pattani Law Group

(57) ABSTRACT

A method in a mesh network including a first device and a second device, the method including receiving, by the first device from a third-party application installed on the first device, an initiation packet including information to be received by the second device, the initiation packet indicating a meshnet IP address assigned to the second device as a destination address; transmitting, by the first device via a meshnet connection between the first device and the second device, the initiation packet to the second device; receiving, by the first device via the meshnet connection and based at least in part on transmitting the initiation packet, a response packet from the second device, the response packet including information to be received by the third-party application; and transmitting, by the first device, the response packet to the third-party application is disclosed. Various other aspects are contemplated.

20 Claims, 7 Drawing Sheets

(56) References Cited

U.S. PATENT DOCUMENTS

2024/0031160 A1\* 1/2024 Valkaitis ............... H04L 9/0825

\* cited by examiner

OPTIMIZING COMMUNICATION BETWEEN MESHNET DEVICES IN A MESH NETWORK

CROSS REFERENCE

This application is a continuation of U.S. Non-Provisional patent application Ser. No. 18/200,512, filed on May 22, 2023, and titled "OPTIMIZING COMMUNICATION BETWEEN MESHNET DEVICES IN A MESH NETWORK," the entire contents of which are incorporated herein by reference.

FIELD OF DISCLOSURE

Aspects of the present disclosure generally relate to communications in networks, and more particularly to optimizing network management and communication between meshnet devices in a mesh network.

BACKGROUND

Users may rely on mesh networks (also referred to as "meshnets") to communicate (e.g., transmit and/or receive) data among a plurality of meshnet devices (e.g., user devices) via one or more Internet nodes (e.g., bridges, switches, infrastructure devices, etc.). In an example, a mesh network may include a plurality of meshnet devices communicatively coupled to each other directly or via the one or more Internet nodes. A mesh network in which all meshnet devices are communicatively coupled to each other may be referred to as a fully connected network. Data transmitted by a first meshnet device, from among the plurality of meshnet devices, may be routed over the Internet via the one or more Internet nodes to a second meshnet device from among the plurality of meshnet devices. Also, data transmitted by the first meshnet device may be routed to two or more meshnet devices from among the plurality of meshnet devices.

In a mesh network, the plurality of meshnet devices may cooperate with each other to enable communication of the data among the plurality of meshnet devices. In an example, one or more of the meshnet devices may participate in communication of the data. In this way, the mesh network may avoid relying on a given meshnet device for communication of the data. Some mesh networks may have the ability to dynamically self-organize and self-configure the plurality of meshnet devices. This ability may allow such mesh networks to enable dynamic distribution of workloads, particularly in the event that one or more meshnet devices should fail. Further, installation overhead may be reduced.

SUMMARY

In one aspect, the present disclosure contemplates a method in a mesh network including a first meshnet device in communication with a second meshnet device, the method comprising: transmitting, by the first meshnet device to a third-party web application installed on the first meshnet device, an association between the second meshnet device and a unique identifier that identifies the second meshnet device; receiving, by the first meshnet device from the third-party web application, a query for a meshnet internet protocol (IP) address assigned to the second meshnet device, the query including the unique identifier that identifies the second meshnet device; transmitting, by the first meshnet device to the third-party web application based at least in part on receiving the query, the meshnet IP address assigned to the second meshnet device; receiving, by the first meshnet device from the third-party web application based at least in part on transmitting the meshnet IP address, a communication packet to be transmitted to the second meshnet device, the communication packet indicating the meshnet IP address as a destination address; and transmitting, by the first meshnet device, the communication packet to the second meshnet device via a meshnet connection between the first meshnet device and the second meshnet device.

In another aspect, the present disclosure contemplates a first meshnet device in communication with a second meshnet device in a mesh network, the first meshnet device comprising: a memory; and a processor communicatively coupled to the memory, the memory and the processor being configured to: transmit, to a third-party web application installed on the first meshnet device, an association between the second meshnet device and a unique identifier that identifies the second meshnet device; receive, from the third-party web application, a query for a meshnet internet protocol (IP) address assigned to the second meshnet device, the query including the unique identifier that identifies the second meshnet device; transmit, to the third-party web application based at least in part on receiving the query, the meshnet IP address assigned to the second meshnet device; receive, from the third-party web application based at least in part on transmitting the meshnet IP address, a communication packet to be transmitted to the second meshnet device, the communication packet indicating the meshnet IP address as a destination address; and transmit the communication packet to the second meshnet device via a meshnet connection between the first meshnet device and the second meshnet device.

In another aspect, the present disclosure contemplates a non-transitory computer readable medium storing instructions, which when executed by a processor associated with a first meshnet device in communication with a second meshnet device in a mesh network, configure the processor to: transmit, to a third-party web application installed on the first meshnet device, an association between the second meshnet device and a unique identifier that identifies the second meshnet device; receive, from the third-party web application, a query for a meshnet internet protocol (IP) address assigned to the second meshnet device, the query including the unique identifier that identifies the second meshnet device; transmit, to the third-party web application based at least in part on receiving the query, the meshnet IP address assigned to the second meshnet device; receive, from the third-party web application based at least in part on transmitting the meshnet IP address, a communication packet to be transmitted to the second meshnet device, the communication packet indicating the meshnet IP address as a destination address; and transmit the communication packet to the second meshnet device via a meshnet connection between the first meshnet device and the second meshnet device.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
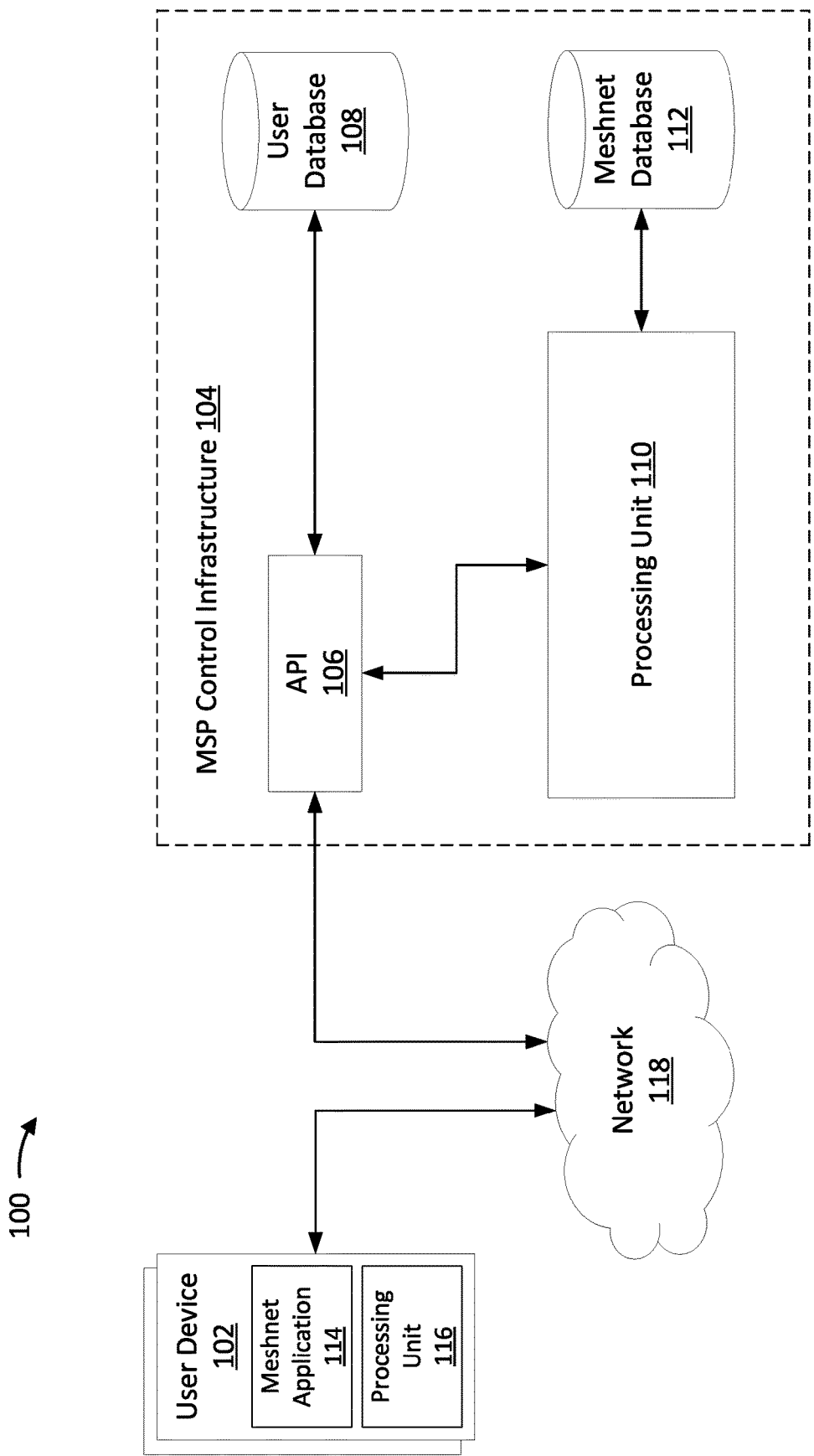

FIG. 1 is an illustration of an example system associated with optimizing communication between meshnet devices in a mesh network, according to various aspects of the present disclosure.

Figure 2:
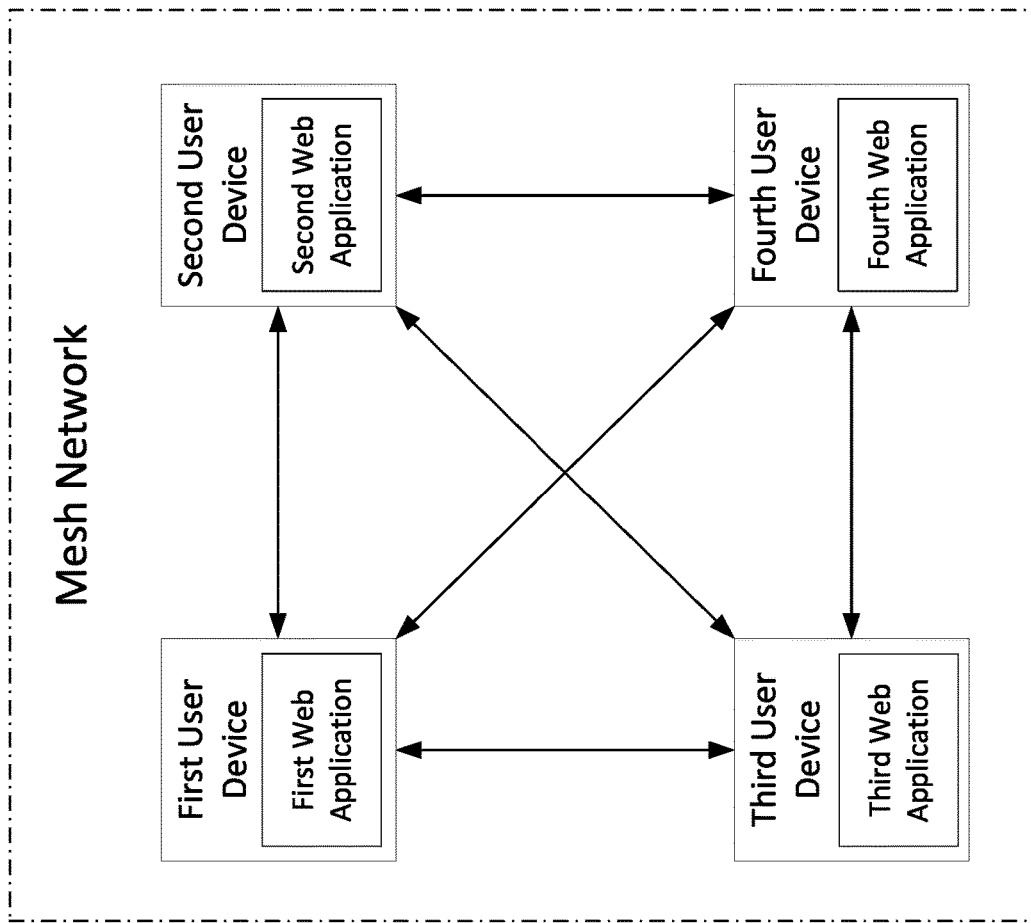

FIG. 2 is an illustration of an example associated with optimizing communication between meshnet devices in a mesh network, according to various aspects of the present disclosure.

Figure 3:
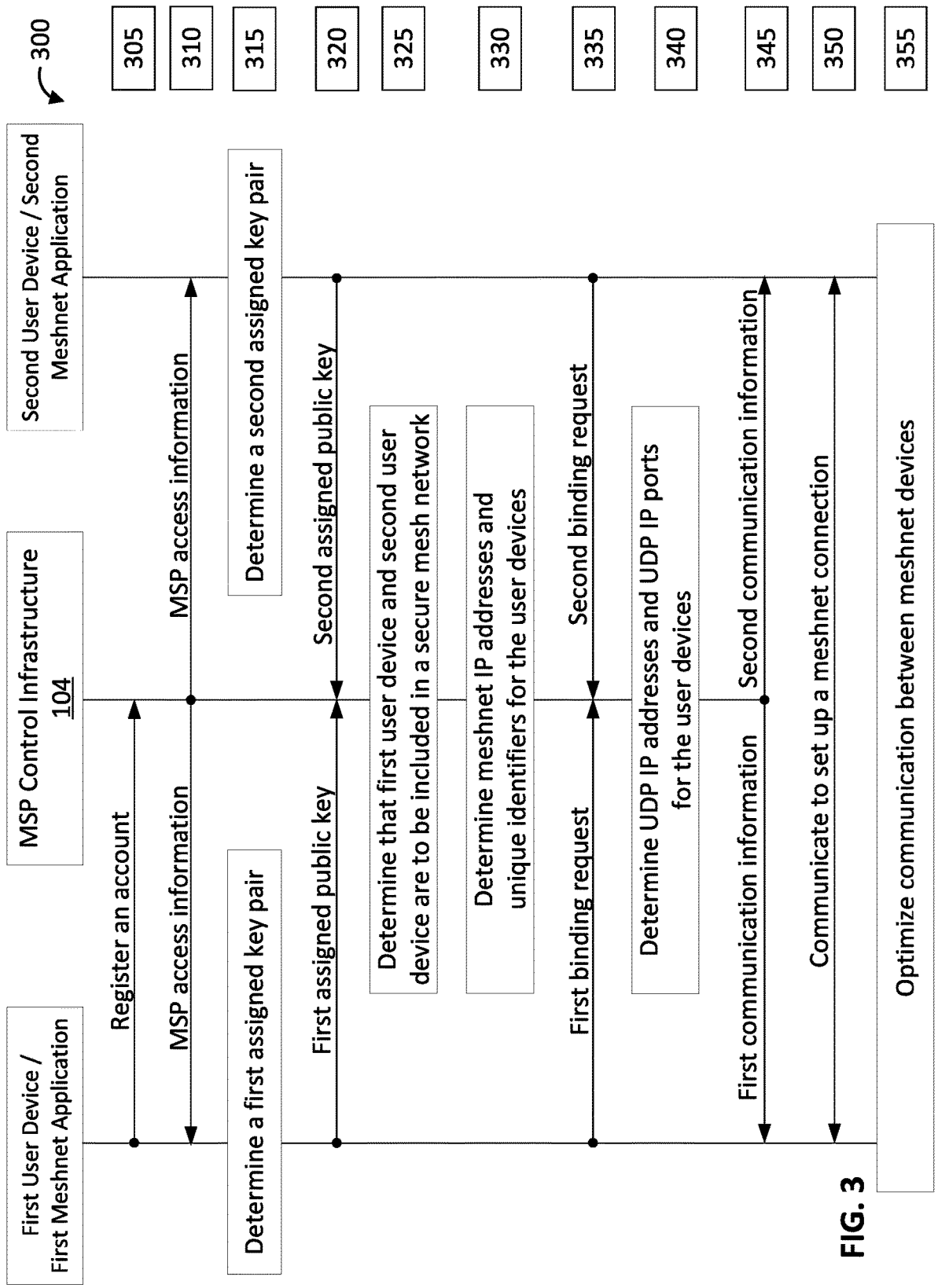

FIG. 3 is an illustration of an example flow associated with optimizing communication between meshnet devices in a mesh network, according to various aspects of the present disclosure.

Figure 4:
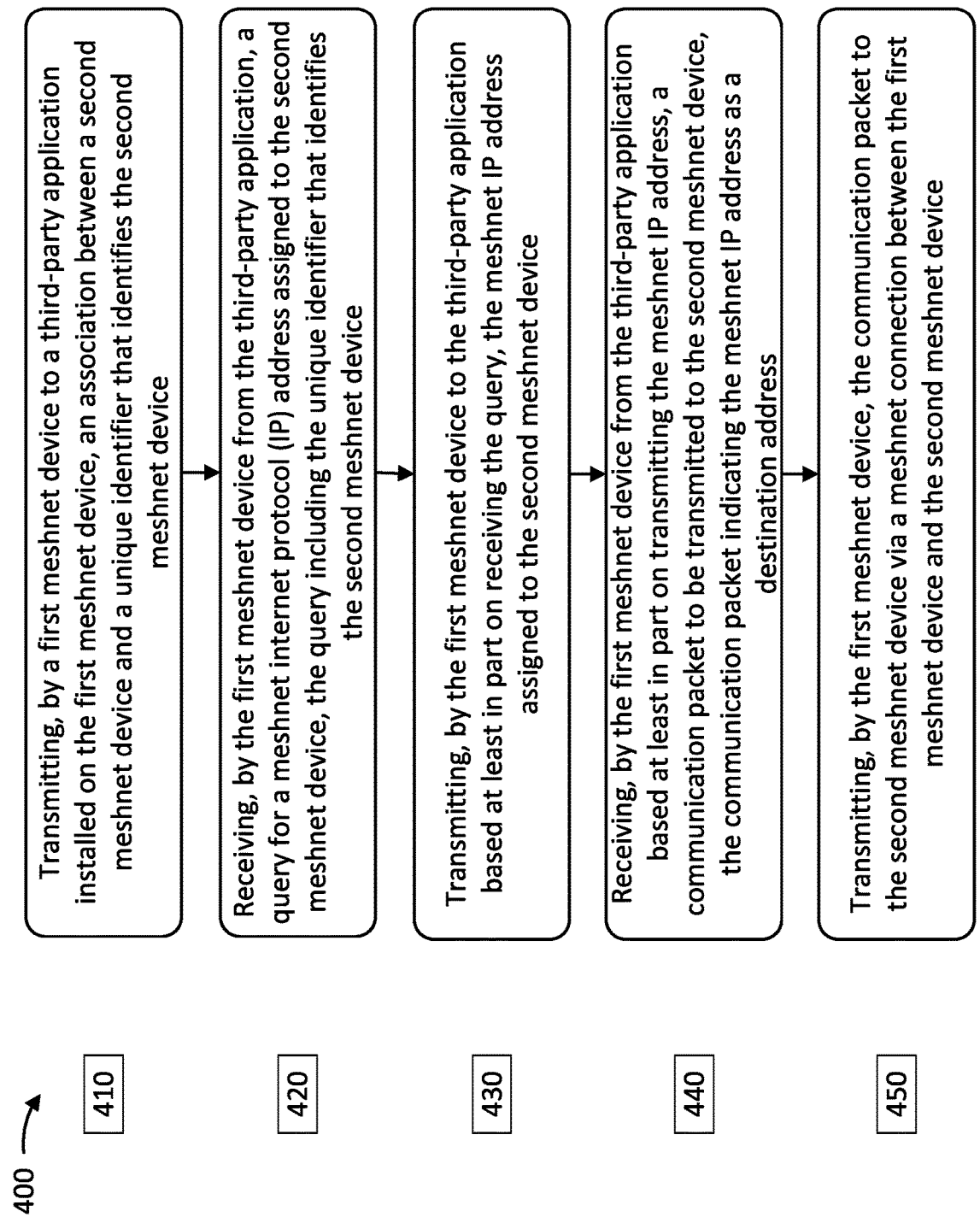

FIG. 4 is an illustration of an example process associated with optimizing communication between meshnet devices in a mesh network, according to various aspects of the present disclosure.

Figure 5:
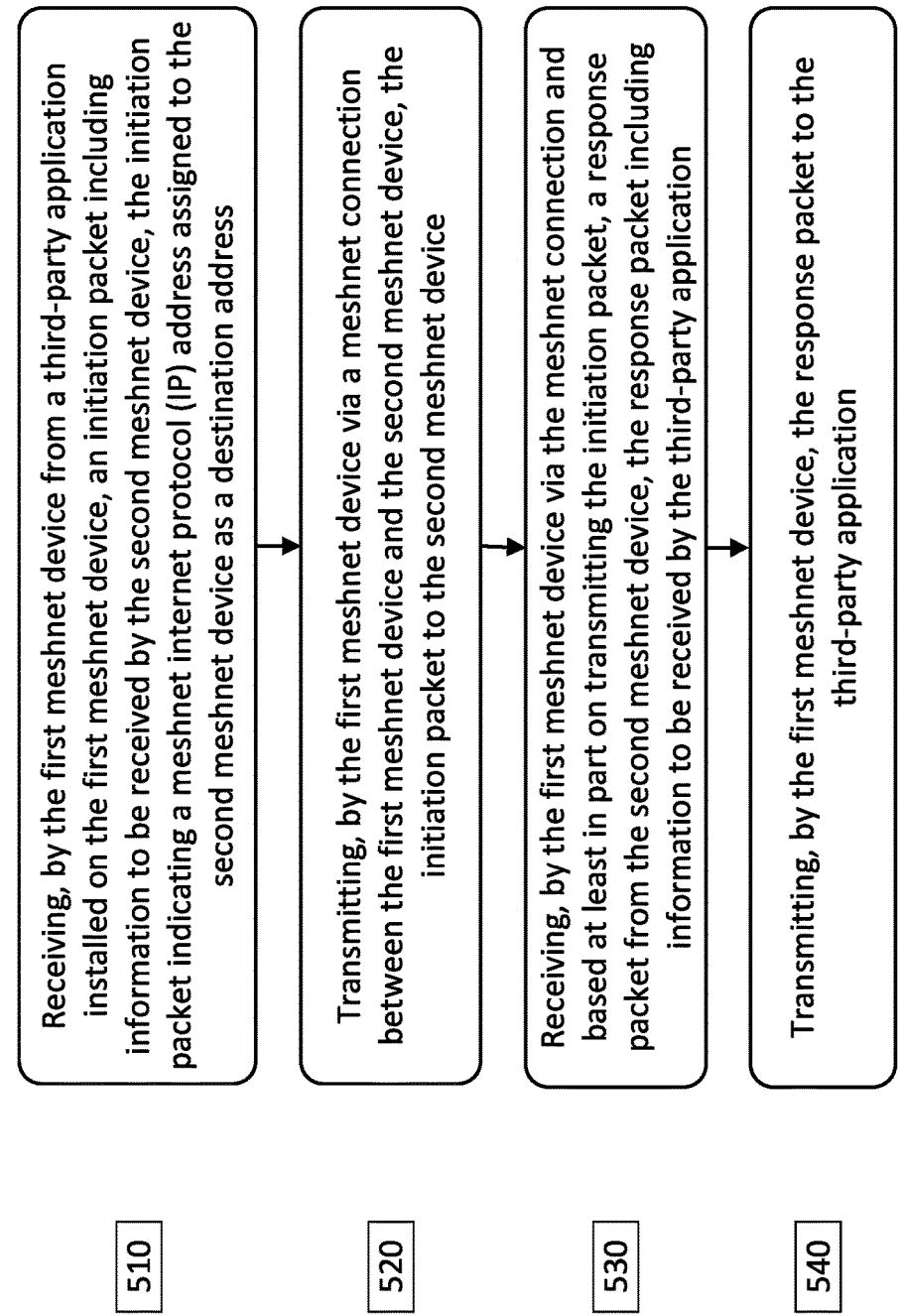

FIG. 5 is an illustration of an example process associated with optimizing communication between meshnet devices in a mesh network, according to various aspects of the present disclosure.

Figure 6:
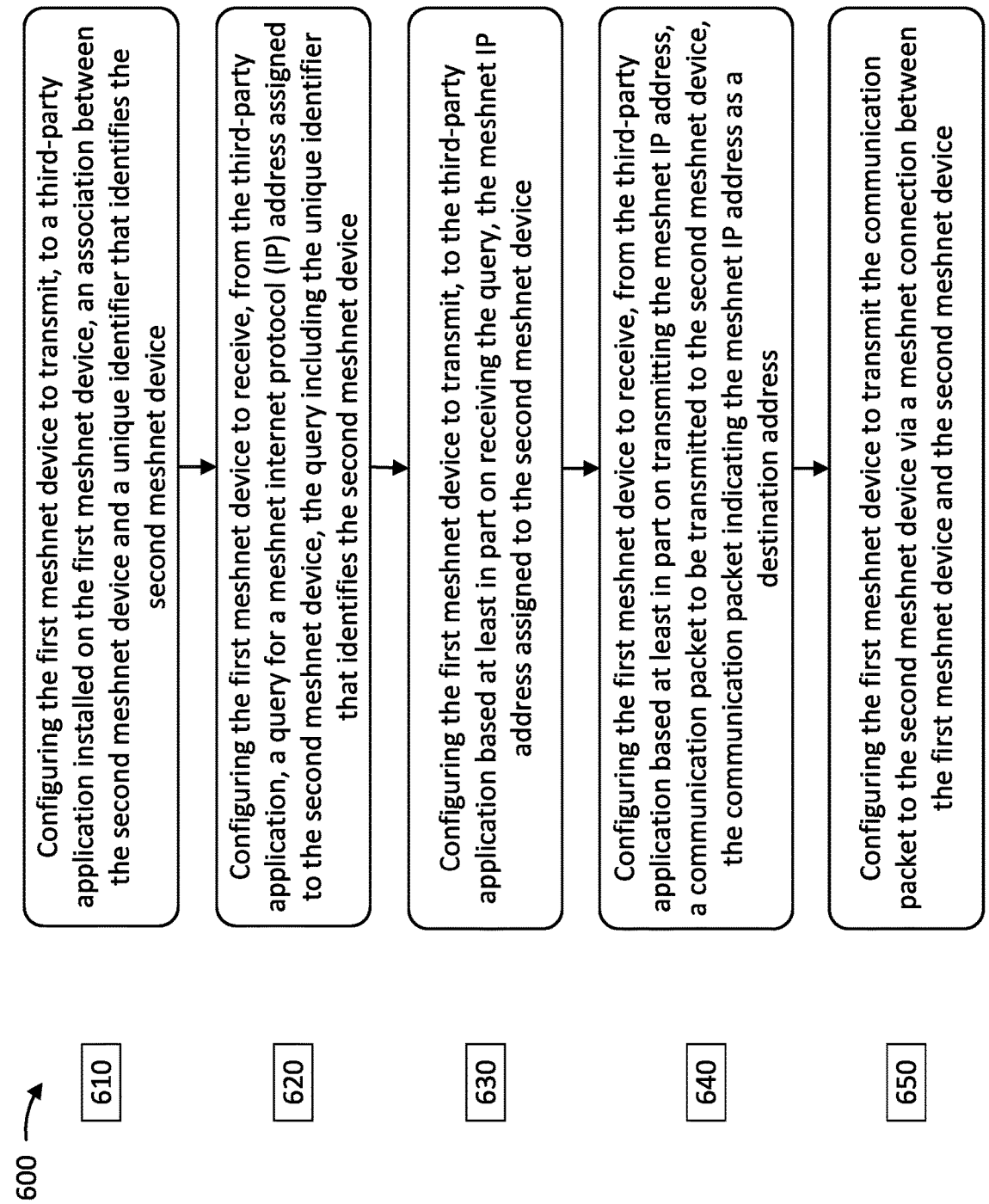

FIG. 6 is an illustration of an example process associated with optimizing communication between meshnet devices in a mesh network, according to various aspects of the present disclosure.

Figure 7:
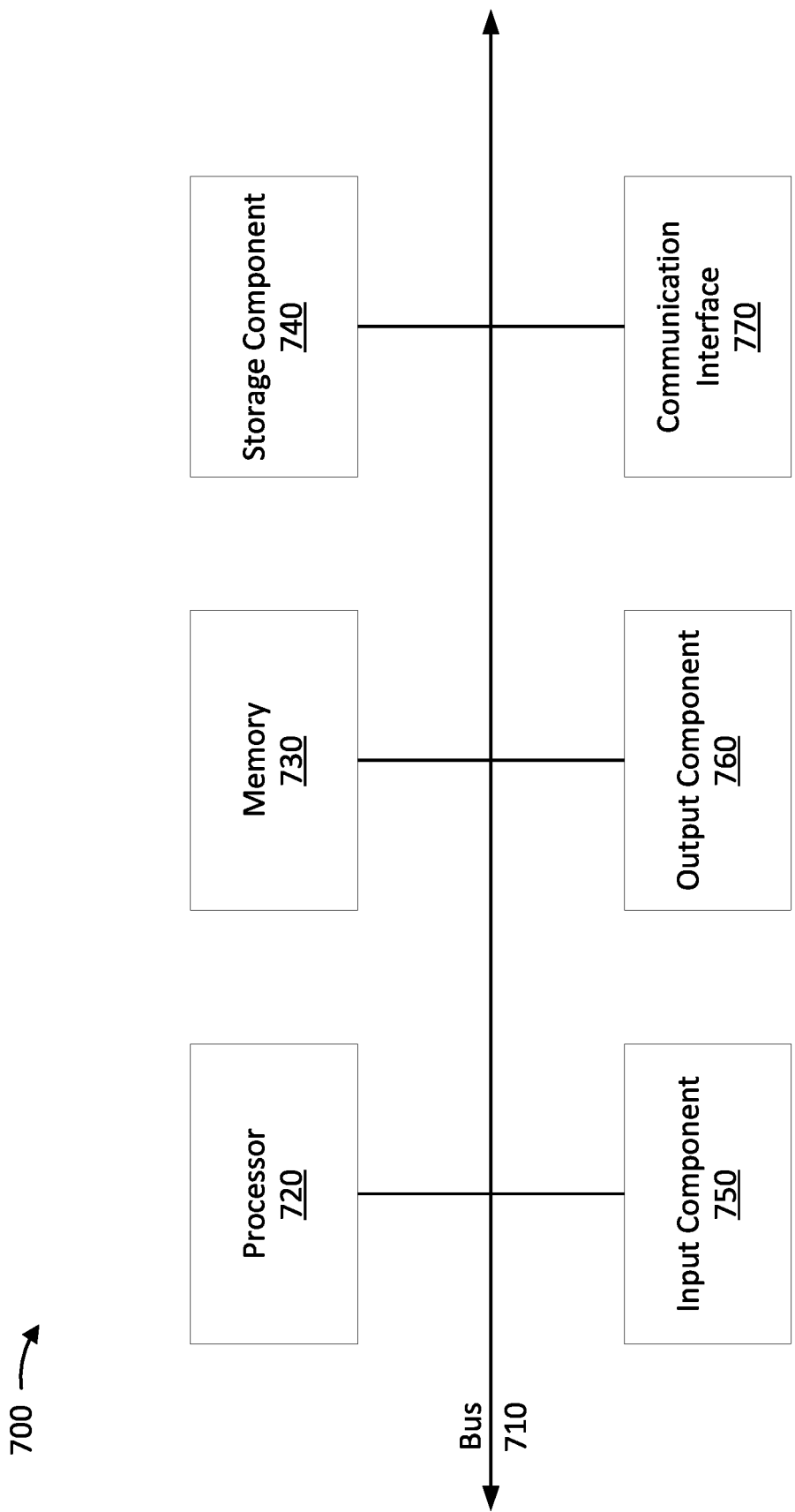

FIG. 7 is an illustration of example devices associated with optimizing communication between meshnet devices in a mesh network, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances, the same reference numbers are used throughout the drawings to refer to the same or like parts.

FIG. 1 is an illustration of an example 100 associated with optimizing communication between meshnet devices in a mesh network, according to various aspects of the present disclosure. Example 100 shows an architectural depiction of included components. In some aspects, the components may include one or more user devices 102 capable of communicating with a mesh network service provider (MSP) control infrastructure 104 for purposes of obtaining mesh network services. In some aspects, the one or more user devices 102 may communicate with the MSP control infrastructure 104 over a network 118. The MSP control infrastructure 104 may be controlled by a mesh network service provider and may include an application programming interface (API) 106, a user database 108, processing unit 110, and a meshnet database 112. In some aspects, a user device 102 may utilize a processing unit 116 and/or a meshnet application 114, which is provided by the MSP control infrastructure 104, to communicate with the API 106. The API 106 may be capable of communicating with the user database 108 and with the processing unit 110. Additionally, the processing unit 110 may be capable of communicating with the meshnet database 112, which may be capable of storing data associated with providing mesh network services.

The user device 102 may be a physical computing device capable of hosting the meshnet application 114 and of connecting to the network 118. The user device 102 may be, for example, a laptop, a mobile phone, a tablet computer, a desktop computer, a smart device, a router, or the like. In some aspects, the user device 102 may include, for example, Internet-of-Things (IoT) devices such as MSP smart home appliances, smart home security systems, autonomous vehicles, smart health monitors, smart factory equipment, wireless inventory trackers, biometric cyber security scanners, or the like. The network 118 may be any digital telecommunication network that permits several nodes to share and access resources. In some aspects, the network 118 may include one or more networks such as, for example, a local-area network (LAN), a wide-area network (WAN), a campus-area network (CAN), a metropolitan-area network (MAN), a home-area network (HAN), Internet, Intranet, Extranet, and Internetwork.

The MSP control infrastructure 104 may include a combination of hardware and software components that enable provision of mesh network services to the user device 102. The MSP control infrastructure 104 may interface with (the meshnet application on) the user device 102 via the API 106, which may include one or more meshnet devices to a defined request-response message system. In some aspects, the API 106 may be configured to receive, via the network 118, a connection request from the user device 102 to establish a connection with the MSP control infrastructure 104 for purposes of obtaining the mesh network services. The connection request may include an authentication request to authenticate the user device 102. The API 106 may receive the authentication request and a request for the mesh network services in a single connection request. In some aspects, the API 106 may receive the authentication request and the request for the mesh network services in separate connection requests.

The API 106 may further be configured to handle the connection request by mediating the authentication request.

For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The mesh network service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the mesh network service provider may provide mesh network services to the user device 102. When the received credentials fail to match at least one of the valid credentials, the user database 108 and the processor may fail to authenticate the user device 102. In this case, the mesh network service provider may decline to provide mesh network services to the user device 102.

When the user device 102 is authenticated, the user device 102 may initiate a connection and may transmit to the API 106 a request for the mesh network services. The processing unit 110 included in the MSP control infrastructure 104 may be configured to determine a mesh network associated with the user device 102 and/or to identify one or more user devices to be included within the determined mesh network. The processing unit 110 may utilize the API 106 to transmit information associated with the mesh network and/or the identified one or more user devices to the user device 102. The user device 102 may transmit an initiation request to establish secure connections (e.g., encrypted tunnels) with the one or more user devices. In some aspects, the one or more user devices with which the user device 102 establishes the secure connections may also host respective meshnet applications for communicating with the MSP control infrastructure 104 and/or with the user device 102. In some aspects, the processing unit 110 may be a logical unit including a logical component configured to perform complex operations associated with computing, for example, numerical weights related to various factors associated with providing the meshnet services.

One or more components (e.g., API 106, user database 108, processing unit 110, and/or meshnet database 112, processing unit 116) included in the MSP control infrastructure 104 and/or included in the user device 102 may further be associated with a controller/processor, a memory, a communication interface, or a combination thereof (e.g., FIG. 7). For instance, the one or more components may include or may be included in a controller/processor, a memory, or a combination thereof. In some aspects, the one or more components may be separate and distinct from each other. Alternatively, in some aspects, the one or more components may be combined with another one of the one or more components. In some aspects, the one or more components may be local with respect to each other. Alternatively, in some aspects, the one or more components may be located remotely with respect to another one of the one or more components. Additionally, or alternatively, the one or more components may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, the one or more components shown in FIG. 1 may be configured to perform one or more functions described as being performed by another one of the one or more components shown in FIG. 1.

As indicated above, FIG. 1 is provided as an example. Other examples may differ from what is described with regard to FIG. 1.

Meshnet devices (e.g., user devices) may rely on a mesh network to communicate (e.g., transmit and/or receive) meshnet data among the meshnet devices. In example 200 shown in FIG. 2, the meshnet devices may include a first user device, a second user device, a third user device, and/or a fourth user device. The meshnet data may be communicated using wired communications and/or wireless communications over a network such as, for example, the Internet. The communicated meshnet data (e.g., meshnet communications) may include any information including digital information such as, for example, documents including data, voice data, image data, signal data, and/or video data. Further, the internal mesh network may be a secure mesh network that may enable the meshnet devices to communicate the meshnet data in encrypted form via meshnet connections (shown as double-ended arrows in FIG. 2).

In some cases, the meshnet devices may utilize third-party web applications (e.g., web browsers, messaging applications, client applications, etc.) to communicate the meshnet data with each other. In an example, the first meshnet device may include a first web application, the second meshnet device may include a second web application, the third meshnet device may include a third web application, and the fourth meshnet device may include a fourth web application.

To communicate the meshnet data via the meshnet connections, the web applications may need to utilize meshnet IP addresses assigned to the meshnet devices in the mesh network. There may not be a way to configure the web applications to store correlations between the meshnet devices and their respective meshnet IP addresses. For instance, a third-party may not make available the facility to configure a web application or a web application may not include a functionality to store correlations between the meshnet devices and their respective meshnet IP addresses. As a result, the first meshnet device may be unable to configure the first web application to store a first correlation between the first meshnet device and a first meshnet IP address assigned to the first meshnet device, a second correlation between the second meshnet device and a second meshnet IP address assigned to the second meshnet device, a third correlation between the third meshnet device and a third meshnet IP address assigned to the third meshnet device, and a fourth correlation between the fourth meshnet device and a fourth meshnet IP address assigned to the fourth meshnet device. In a similar and/or analogous manner, all other meshnet devices may be unable to configure the web applications to store correlations between the meshnet devices and the respective meshnet IP addresses.

Further, the meshnet devices may be unable to configure the web applications to update correlations when the meshnet IP addresses assigned to the meshnet devices are changed. In an example, when the first meshnet IP address is changed to a new first IP address when, for example, the first meshnet device leaves and rejoins the mesh network, the first meshnet device may be unable to configure the first web application to update the first correlation to include the new first meshnet IP address. In another example, when the third meshnet IP address is changed to a new third meshnet IP address when, for example, the third meshnet device leaves and rejoins the mesh network, the first meshnet device may be unable to configure the first web application to update the third correlation to include the new third meshnet IP address. In a similar and/or analogous manner, all meshnet devices may be unable to configure the web applications to update the stored correlations between the meshnet devices and the respective meshnet IP addresses.

Additionally, a meshnet device may be unable to configure a web application to store correlations and/or update stored correlations when, for example, a software version of the web application is updated to a new software version by the third party responsible for configuring and/or managing the web application.

Enabling web applications to communicate the meshnet data while being unable to configure the web applications to store the correlations between the meshnet devices and their respective meshnet IP addresses and/or being unable to configure the web application to update the stored correlations may inefficiently consume user device resources (e.g., processing resources, memory resources, power consumption resources, battery life, or the like) and mesh network resources (computational resources, network bandwidth, management resources, processing resources, memory resources, or the like) that can otherwise be used to perform suitable tasks associated with the mesh network.

Various aspects of systems and techniques discussed in the present disclosure enable optimizing communication between meshnet devices in a mesh network. In some aspects, an MSP control infrastructure may provide the mesh network to enable meshnet devices to securely communicate meshnet data. Further, the MSP control infrastructure may provide the meshnet devices with respective meshnet applications to communicate with the MSP control infrastructure, to communicate with each other for setting up respective meshnet connections to be utilized for communicating meshnet data in the mesh network, and/or to communicate the meshnet data (e.g., meshnet communications) with each other over the respective meshnet connections.

The MSP control infrastructure and the respective meshnet applications may also enable optimizing communication between meshnet devices in the mesh network. In some aspects, the MSP control infrastructure may determine identifiers to uniquely identify each meshnet device included in the mesh network. Further, the MSP control infrastructure may provide the unique identifiers to each meshnet device via communication information. Based at least in part on receiving the communication information, a first meshnet device may enable a first web application installed on the first meshnet device to utilize associations between the meshnet devices and their respective unique identifiers to determine respective meshnet IP addresses. For instance, when the first web application is to communicate with, for example, a second meshnet device, the first meshnet device may enable the first web application to utilize a second identifier that uniquely identifies the second user device to determine, in real time, a current second meshnet IP address associated with the second meshnet device. Based at least in part on determining the current second meshnet IP address, a first meshnet application may enable the first web application to utilize the current second meshnet IP address to communicate with the second meshnet device. When the current second meshnet IP address changes to a new second meshnet IP address, the MSP control infrastructure may provide the new second meshnet IP address to the first meshnet device (and other connected meshnet devices). In this case, the first meshnet device may selectively enable the first web application to determine the change. In an example, when the first meshnet device determines that communication between the first web application and the second meshnet device is ongoing, the first meshnet device may selectively enable the first web application to determine the new second meshnet IP address. In this way, the first meshnet device may enable the first web application to determine the current second meshnet IP address to enable the first web application to communicate with the second meshnet device without configuring the first web application to store the correlations between the meshnet devices and their respective meshnet IP addresses and/or to update the stored correlations. As a result, efficient utilization of user device resources (e.g., processing resources, memory resources, power consumption resources, battery life, or the like) and mesh network resources (computational resources, network bandwidth, management resources, processing resources, memory resources, or the like) for performing suitable tasks associated with the mesh network may be enabled.

In some aspects, a processor (e.g., processing unit 116, processor 720) associated with a user device may transmit, to a third-party web application installed on the first meshnet device, an association between the second meshnet device and a unique identifier that identifies the second meshnet device; receive, from the third-party web application, a query for a meshnet internet protocol (IP) address assigned to the second meshnet device, the query including the unique identifier that identifies the second meshnet device; transmit, to the third-party web application based at least in part on receiving the query, the meshnet IP address assigned to the second meshnet device; receive, from the third-party web application based at least in part on transmitting the meshnet IP address, a communication packet to be transmitted to the second meshnet device, the communication packet indicating the meshnet IP address as a destination address; and transmit the communication packet to the second meshnet device via a meshnet connection between the first meshnet device and the second meshnet device.

As indicated above, FIG. 2 is provided as an example. Other examples may differ from what is described with regard to FIG. 2.

FIG. 3 is an illustration of an example flow 300 associated with optimizing communication between meshnet devices in a mesh network, according to various aspects of the present disclosure. The example flow 300 may include a first user device (e.g., first meshnet device), MSP control infrastructure 104, and a second user device (e.g., second meshnet device) in communication with each other. The first user device and the second user device may be similar to a user device 102 discussed above with respect to FIG. 1. In some aspects, the first user device and the second user device may be associated with a single account registered with the MSP control infrastructure 104. In some aspects, the first user device and the second user device may be associated with different accounts registered with the MSP control infrastructure 104. In some aspects, the first user device and the second user device may be located locally (e.g., in the same room, in the same building, etc.). In some aspects, the first user device and the second user device may be located remotely (e.g., in different buildings, in different cities, in different states, in different countries, etc.) with respect to each other.

The first user device may install a first meshnet application (e.g., meshnet application 114) and the second user device may install a second meshnet application (e.g., meshnet application 114), the first meshnet application and the second meshnet application being associated with (e.g., provided by) the MSP control infrastructure 104. The first user device and the second user device may use the respective meshnet applications to communicate with an application programming interface (API) and/or a processor (e.g., processing unit 110, processor 720) associated with the MSP control infrastructure 104. In some aspects, the first user device, the MSP control infrastructure 104, and the second user device may communicate with each other over a network (e.g., network 118). As discussed elsewhere herein, the MSP control infrastructure 104 may enable the first user device and/or the second user device to obtain the mesh network services.

In some aspects, the meshnet applications may enable the user devices to receive information to be processed by the meshnet applications and/or by the MSP control infrastructure 104. Each of the meshnet applications may include respective graphical user interfaces to receive the information via local input interfaces (e.g., touch screen, keyboard, mouse, pointer, etc.) associated with the user devices. The information may be received via text input or via a selection from among a plurality of options (e.g., pull down menu, etc.). In some aspects, the first meshnet application and/or the second meshnet application may activate and/or enable, at a time associated with the registration (e.g., after the registration), the graphical interface for receiving the information. For instance, the first meshnet application (or the second meshnet application) may cause a screen (e.g., local screen) associated with the first user device (or the second user device) to display, for example, a pop-up message to request entry of the information. Further, the meshnet applications may enable transmission of at least a portion of the information to the MSP control infrastructure 104. In some aspects, the first meshnet application may utilize a first processing unit (e.g., processing unit 116, processor 720) associated with the first user device to perform processes/operations associated with obtaining the mesh network services and the second application may utilize a second processing unit (e.g., processing unit 116, processor 720) associated with the second user device to perform processes/operations associated with obtaining the mesh network services.

Although only two user devices (e.g., meshnet devices) are shown in FIG. 3, the present disclosure contemplates the mesh network to include any number of user devices that perform the processes discussed herein in a similar and/or analogous manner. For instance, the mesh network may include a third user device and a fourth user device, as discussed above with respect to FIG. 2, that perform the processes discussed herein in a similar and/or analogous manner. Further, user devices may leave or join the mesh network in an ad-hoc manner.

As shown by reference numeral 305, the first user device may register an account with the MSP control infrastructure 104. In some aspects, during the registration, the first user device may provide registration information such as, for example, identity of an owner of the first user device, a phone number associated with the first user device, an email address associated with the first user device, or the like. In some aspects, the first user device may set up an access system including login information (e.g., access information) such as, for example, username, password, or the like to subsequently gain access to the registered account. In some aspects, the first user device may share the login information with other user devices (e.g., second user device) associated with the first user device to enable the other user devices to utilize the login information to gain access to the MSP control infrastructure 104 via the registered account. In some aspects, a given user device may be associated with the first user device because the given user device may be available to a user/owner of the first user device. In some aspects, when the second user device is not associated with the registered account associated with the first user device, the second user device may register a different account with the MSP control infrastructure 104.

In some aspects, the first user device and the second user device may utilize the login information to access the registered account/accounts to communicate with the MSP control infrastructure 104. As shown by reference numeral 310, based at least in part on the first user device and the second user device accessing the registered account/accounts to communicate with the MSP control infrastructure 104, the MSP control infrastructure 104 may transmit, and the first meshnet application and the second meshnet application may receive, MSP access information. In some aspects, the MSP access information may include UDP access information. The UDP access information may include information regarding an infrastructure UDP IP address and an infrastructure UDP port associated with the MSP control infrastructure 104. The MSP control infrastructure 104 may utilize the infrastructure UDP IP address and the infrastructure UDP port to communicate utilizing the UDP. In some aspects, the first user device and the second user device may utilize the infrastructure UDP IP address and the infrastructure UDP port to communicate with the MSP control infrastructure 104 regarding the mesh network. Further, the first meshnet application and the second meshnet application may obtain from, for example, a domain name services (DNS) server, transmission control protocol (TCP) access information associated with the MSP control infrastructure 104. Such TCP access information may include information regarding an infrastructure TCP IP address and an infrastructure TCP port associated with the MSP control infrastructure 104. The MSP control infrastructure 104 may utilize the infrastructure TCP IP address and the infrastructure TCP port to communicate utilizing the TCP.

As shown by reference numeral 315, the first meshnet application and the second meshnet application may determine information based at least in part on the registration of the account/accounts with the MSP control infrastructure 104. In an example, the first meshnet application may determine an asymmetric first assigned key pair associated with the first user device. The first assigned key pair may be unique to the first user device and may include a first assigned public key and a first assigned private key. In this way, the first assigned public key and the first assigned private key may be device-specific and maybe associated with the registered account. In some aspects, the first assigned public key and the first assigned private key may be associated with each other via, for example, a mathematical function. As a result, data encrypted using the first assigned public key may be decrypted by utilizing the first assigned private key.

Similarly, the second meshnet application may determine an asymmetric second assigned key pair associated with the second user device. The second assigned key pair may be unique to the second user device and may include a second assigned public key and a second assigned private key. In this way, the second assigned public key and the second assigned private key may be device-specific and may be associated with the registered account. In some aspects, the second assigned public key and the second assigned private key may be associated with each other via, for example, a mathematical function. As a result, data encrypted using the second assigned public key may be decrypted by utilizing the second assigned private key.

As shown by reference numeral 320, the meshnet applications may transmit, and the MSP control infrastructure 104 may receive, at least a portion of the information determined by the meshnet applications. For instance, the first meshnet application may transmit, for example, the first assigned public key to the MSP control infrastructure 104 and the second meshnet application may transmit, for example, the second assigned public key to the MSP control infrastructure 104. The MSP control infrastructure 104 may store and correlate the received information in association with the registered account and/or with the respective user devices. In an example, the MSP control infrastructure 104 may store and correlate the first assigned public key in association with the registered account and the first user device, and may store and correlate the second assigned public key in association with the registered account and the second user device. In some aspects, the first meshnet application and the second meshnet application may utilize the infrastructure TCP IP address and the infrastructure TCP port to transmit the first assigned public key and the second assigned public key to the MSP control infrastructure 104 via the TCP.

Further, as shown by reference numeral 325, the MSP control infrastructure 104 may determine that the first user device and the second user device are to be included in the same mesh network. In some aspects, when the first user device and the second user device are associated with the same registered account, the MSP control infrastructure 104 may make such a determination regarding the secure mesh network based at least in part on determining that the first user device and the second user device are communicating with the MSP control infrastructure 104 by utilizing the login information associated with the same registered account. In some aspects, when the first user device and the second user device are associated with different registered accounts, the MSP control infrastructure 104 may make such a determination regarding the secure mesh network based at least in part on the first user device (and/or the second user device) providing information indicating that the first user device and the second user device are to be included in the same mesh network. Such information may include, for example, identification information (e.g., type of device, user name, email address, etc.) associated with the second user device (or the first user device), the second IP address (or the first IP address), or the like.

Based at least in part on determining that the first user device and the second user device are to be included in the same mesh network, as shown by reference numeral 330, the MSP control infrastructure 104 may determine meshnet IP addresses and/or unique identifiers for the first user device and for the second user device. With respect to the meshnet IP addresses, the MSP control infrastructure 104 may determine a first meshnet IP address associated with the first user device and a second meshnet IP address associated with the second user device. The first meshnet application and/or another application installed on the first user device and/or the operating system associated with the first user device may utilize the first meshnet IP address and/or the first local meshnet port to communicate data with the meshnet devices over meshnet connections in the mesh network and the second user device may utilize the second meshnet IP address and/or the second local meshnet port to communicate data with the meshnet devices over the meshnet connections in the mesh network. In an example, with respect to communication between the first user device and the second user device, the first user device may determine a first meshnet IP packet indicating the first meshnet IP address as a source address, the first local meshnet port as a source port, the second meshnet IP address as a destination address, and the second local meshnet port as a destination port. The first user device may encrypt and encapsulate the first meshnet IP packet within a payload of a transmitted UDP IP packet. The second user device may receive the UDP IP packet, may decrypt the first meshnet IP packet, and may route the first meshnet IP packet to the second local meshnet port. Similarly, the second user device may determine a second meshnet IP packet indicating the second meshnet IP address as a source address, the second local meshnet port as a source port, the first meshnet IP address as a destination address, and the first local meshnet port as a destination port. The second user device may encrypt and encapsulate the second meshnet IP packet within a payload of a transmitted UDP IP packet. The first user device may receive the UDP IP packet, may decrypt the first meshnet IP packet, and may route the second meshnet IP packet to the first local meshnet port. The MSP control infrastructure 104 may determine the first meshnet IP address and the second meshnet IP address from, for example, a pool of reserved IP addresses included in a subnet associated with an internal network of the ISP.

With respect to the unique identifiers, the MSP control infrastructure 104 may determine a respective unique identifier for each user device to be included in the mesh network. In an example, the MSP control infrastructure 104 may determine a first unique identifier to uniquely identify the first user device, a second unique identifier to uniquely identify the second user device, and so on. In some aspects, a unique identifier may include a string of symbols and/or alphanumeric characters.

In some aspects, example processes associated with blocks 305 through 330 may take place asynchronously. In some aspects, example processes associated with blocks 335 through 355 may take place substantially synchronously.

As shown by reference numeral 335, the first user device and the second user device may transmit, and the MSP control infrastructure 104 may receive, respective binding requests. In some aspects, the first user device may transmit the first binding request to the MSP control infrastructure 104 using the UDP by utilizing the UDP access information received from the MSP control infrastructure 104 (e.g., block 310). In this case, the first user device may transmit a first binding request to the MSP control infrastructure 104 to request the MSP control infrastructure 104 to determine a first public UDP IP address (e.g., communication address) and/or a first public UDP port (e.g., communication port) associated with the first user device. As discussed below in further detail, the first public UDP IP address and/or the first public UDP port are to be utilized by the second user device to communicate with the first user device in the mesh network. Similarly, the second user device may transmit the second binding request to the MSP control infrastructure 104 using the UDP by utilizing the UDP access information received from the MSP control infrastructure 104 (e.g., block 310). In this case, the second user device may transmit a second binding request to the MSP control infrastructure 104 to request the MSP control infrastructure 104 to determine a second public UDP IP address (e.g., communication address) and/or a second public UDP port (e.g., communication port) associated with the second user device. As discussed below in further detail, the second UDP IP address and/or the second UDP port are to be utilized by the first user device to communicate with the second user device in the mesh network.

In some aspects, the first public UDP IP address and/or the first public UDP port may be determined by a first NAT device (e.g., a router) responsible for managing operation of the first user device in a first local network. In an example, the first NAT device may translate a first local UDP IP address and/or a first local UDP port associated with the first user device to the first public UDP IP address and/or the first public UDP port that the first user device utilizes to communicate (e.g., transmit and/or receive) over the Internet using the UDP. Similarly, the second public UDP IP address and/or the second public UDP port may be determined by a second NAT device responsible for managing operation of the second user device in a second local network. In an example, the second NAT device may translate a second local UDP IP address and/or a second local UDP port associated with the second user device to the second public UDP IP address and/or the second public UDP port that the second user device utilized to communicate (e.g., transmit and/or receive) over the Internet using the UDP.

Based at least in part on receiving the respective binding requests, as shown by reference numeral 340, the MSP control infrastructure 104 may determine public UDP IP addresses and/or public UDP ports associated with the first user device and the second user device. In an example, based at least in part on receiving the first binding request, the MSP control infrastructure 104 may determine the first public UDP IP address and/or the first public UDP port associated with the first user device. In some aspects, the MSP control infrastructure 104 may determine the first public UDP IP address and/or the first public UDP port based at least in part on analyzing the UDP communication (e.g., UDP IP packet) including the first binding request received from the first user device. The UDP communication may include, for example, a header that indicates the first public UDP IP address as a source UDP IP address and/or the first public UDP port as a source UDP port associated with the first user device. Further, the MSP control infrastructure 104 may store and correlate the first public UDP IP address and/or the first UDP port in association with the first user device in, for example, the meshnet database 112. Similarly, based at least in part on receiving the second binding request, the MSP control infrastructure 104 may determine the second public UDP IP address and/or the second public UDP port associated with the second user device. In some aspects, the MSP control infrastructure 104 may determine the second public UDP IP address and/or the second public UDP port based at least in part on analyzing the UDP communication (e.g., UDP IP packet) including the second binding request received from the second user device. The UDP communication may include, for example, a header that indicates the second public UDP IP address as a source UDP IP address and/or the second public UDP port as a source UDP port associated with the second user device. Further, the MSP control infrastructure 104 may store and correlate the second public UDP IP address and/or the second public UDP port in association with the second user device in, for example, the meshnet database 112.

Based at least in part on determining the public UDP IP addresses and/or the public UDP ports, as shown by reference numeral 345, the MSP control infrastructure 104 may transmit, and the first meshnet application and the second meshnet application may receive, communication information. In an example, the MSP control infrastructure 104 may transmit, and the first meshnet application may receive, first communication information including the first meshnet IP address associated with the first user device, the second meshnet IP address associated with the second user device, the second public UDP IP address and/or the second public UDP port associated with the second user device, the second public key associated with the second user device, and the unique identifiers determined for each of the user devices. Similarly, the MSP control infrastructure 104 may transmit, and the second meshnet application may receive, second communication information including the first public UDP IP address and/or the first public UDP port associated with the first user device, the first public key associated with the first user device, the first meshnet IP address associated with the first user device, the second meshnet IP address associated with the second user device, and the unique identifiers determined for each of the user devices. As discussed below in further detail, the above transmission of communication information may enable the first user device and the second user device to communicate securely and privately in the mesh network.

As shown by reference numeral 350, the first meshnet application (or first user device) and the second meshnet application (or second user device) may communicate with each other directly to set up a meshnet connection (e.g., an encrypted tunnel) for communicating encrypted data in the mesh network. To set up the meshnet connection, the first meshnet application may utilize the second assigned public key and/or the second public IP address (e.g., second UDP IP address) to securely (e.g., in encrypted form) communicate with the second meshnet application, and the second meshnet application may utilize the first assigned public key and/or the first public IP address (e.g., first UDP IP address) to securely communicate with the first meshnet application. In some aspects, the first meshnet application and the second meshnet application may communicate to securely/privately negotiate parameters (e.g., a symmetric encryption/decryption key) associated with the meshnet connection. In some aspects, the parameters may be randomly generated to provide optimized security to the communications. In an example, the first meshnet application and the second meshnet application may privately negotiate a randomly generated symmetric key that is to be utilized by the first meshnet application and the second meshnet application for encrypting and decrypting data communicated via the meshnet connection. The randomly generated symmetric key may be determined based at least in part on any combination of the first public key, the second public key, and/or randomly generated numbers. Additionally, the first meshnet application and the second meshnet application may utilize a secure protocol (e.g., Wireguard, IP see, etc.) to communicate the data via the meshnet connection.

Additionally, or alternatively, the first meshnet application and the second meshnet application may communicate with each other indirectly via, for example, a relay device (e.g., a relay server) to set up the meshnet connection. In an example, the first meshnet application may provide the first assigned public key to a relay server, which may store an association of the first assigned public key with the first meshnet application. In some aspects, the association may include an association between the first assigned public key and a first communication connection between the relay server and the first meshnet application. Similarly, the second meshnet application may provide the second assigned public key to the relay server, which may store an association of the second assigned public key with the second meshnet application. In some aspects, the association may include an association between the second assigned public key and a second communication connection between the relay server and the first meshnet application. The relay server may rely on the stored associations of public keys and meshnet applications to determine a destination of a received message. In some aspects, the relay server may include a network of relay servers that enable the first meshnet application and the second meshnet application to communicate with each other. In this case, the first meshnet application and the second meshnet application may provide the respective assigned public keys to different relay servers included within the network of relay servers.

In some aspects, the first meshnet application may transmit, to the relay server, a first message that is to be delivered to the second meshnet application. Along with the first message, the first meshnet application may transmit the second assigned public key. Further, the first meshnet application may encrypt the first message utilizing the second assigned public key. In some aspects, the first meshnet application may encrypt the first message based at least in part on utilizing the negotiated randomly generated symmetric key. Based at least in part on receiving the encrypted first message and the second assigned public key, the relay server may determine from stored associations that the second assigned public key is associated with the second meshnet application. As a result, the relay server may determine that the first message is to be relayed (e.g., transmitted) to the second meshnet application. Similarly, the second meshnet application may transmit, to the relay server, a second message that is to be delivered to the first meshnet application. Along with the second message, the second meshnet application may transmit the first assigned public key. Further, the second meshnet application may encrypt the second message utilizing the first assigned public key. In some aspects, the second meshnet application may encrypt the second message based at least in part on utilizing the negotiated randomly generated symmetric key. Based at least in part on receiving the encrypted second message and the first assigned public key, the relay server may determine from stored associations that the first assigned public key is associated with the first meshnet application. As a result, the relay server may determine that the second message is to be relayed (e.g., transmitted) to the first meshnet application. In this way, the relay server may enable the first meshnet application and the second meshnet application to communicate with each other to set up the meshnet connection.

Based at least in part on setting up the meshnet connection, the first meshnet application and the second meshnet application may begin communicating encrypted data via the meshnet connection based at least in part on utilizing the negotiated parameters and the secure protocol. In a similar and/or analogous manner, the first meshnet application may set up meshnet connections with a third meshnet application installed in the third meshnet application and with a fourth meshnet application associated with the fourth meshnet application. Also, in a similar and/or analogous manner, the second meshnet application may set up meshnet connections with the first meshnet application, the third meshnet application, and the fourth meshnet application. Further, in a similar and/or analogous manner, the third meshnet application may set up meshnet connections with the first meshnet application, the second meshnet application, and the fourth meshnet application. Finally, in a similar and/or analogous manner, the fourth meshnet application may set up meshnet connections with the first meshnet application, the second meshnet application, and the third meshnet application. Additional meshnet applications that enter the mesh network may also set up meshnet connections with the other meshnet applications included in the mesh network.

Further, based at least in part on setting up the meshnet connection, as shown by reference numeral 355, the MSP control infrastructure 104, the first user device (and/or the second user device, the third user device, and so on) may optimize communication between meshnet devices in the mesh network. In an example, the first meshnet application may store and maintain, in a memory associated with the first user device, a correlation between the second user device, the second meshnet IP address, and the second unique identifier. Further, the first meshnet application may configure an operating system associated with the first user device to enable the first web application to determine an association between the second user device and the second unique identifier.

Such configuration may enable the first web application to utilize the second unique identifier to identify the second user device based at least in part on referring to the association between the second user device and the second unique identifier. For instance, when the first web application is to communicate with the second user device, the first web application may refer to the association between the second user device and the second unique identifier. The first web application may determine and transmit a query to the first meshnet application to request a second meshnet IP address currently associated with the second user device. The first web application may include the second unique identifier associated with the second user device in the query. In some aspects, the MSP control infrastructure may provide the first meshnet application with a native first DNS server to enable native DNS functionality. The MSP control infrastructure and/or the first user device may assign the first DNS server a first DNS IP address. The query from the first web application may indicate the first DNS IP address of the first DNS server as the destination address. In some aspects, the first web application and the first meshnet application may communicate (e.g., transmit and/or receive) information based at least in part on utilizing the operating system of the first user device. In an example, the first meshnet application may transmit the first DNS IP address to the first web application based at least in part on utilizing the operating system of the first user device.

Based at least in part on receiving the query indicating the second unique identifier, the first meshnet application may determine that the first web application has requested the second meshnet IP address associated with the second user device. In this case, the first meshnet application may utilize the native DNS functionality to determine the second meshnet IP address stored in correlation with the second user device and the second unique identifier. Further, the first meshnet application may transmit a response to the first web application, the response indicating the second meshnet IP address.

In some aspects, the second meshnet IP address that is stored in correlation with the second user device and the second unique identifier may be the current second meshnet IP address assigned to the second user device by the MSP control infrastructure 104. The MSP control infrastructure 104 may monitor the mesh network to determine a change in an assigned meshnet IP address. In an example, the MSP control infrastructure 104 may determine that the second user device has left the mesh network. In this case, the MSP control infrastructure 104 may unassign the second meshnet IP address from the second user device to, for example, enable efficient utilization of meshnet IP addresses. At a later time, the MSP control infrastructure 104 may determine that the second user device has rejoined the mesh network. In this case, the MSP control infrastructure 104 may assign a new second meshnet IP address to the second user device. When the MSP control infrastructure 104 assigns a new second meshnet IP address in place of the current second meshnet IP address, the MSP control infrastructure 104 may transmit updated communication information (e.g., first communication information, second communication information, etc.) to the user devices included in the mesh network, the updated communication information indicating that the new second meshnet IP address is now assigned (e.g., currently assigned) to the second user device. Based at least in part on receiving the updated communication information, the first meshnet application may update the stored correlation between the second meshnet IP address, the second unique identifier, and the second user device to include the new second meshnet IP address. Further, based at least in part on receiving the updated communication information, the first meshnet application may selectively transmit an update message to the first web application via the operating system, the update message indicating that the new second meshnet IP address is now assigned (e.g., currently assigned) to the second user device. In some aspects, the first meshnet application may select to transmit the update message based at least in part on detecting ongoing communication between the first web application and the second user device.

Based at least in part on receiving the second meshnet IP address, the first web application may utilize the second meshnet IP address for future communication with the second user device. In an example, the first web application may determine an initiation communication packet to be communicated to the second user device via the meshnet connection between the first user device and the second user device. The initiation communication packet may include an initiation header indicating the second meshnet IP address as a destination address to indicate that the initiation communication packet is to be transmitted to the second user device via the meshnet connection. The initiation header may also indicate a designated IP address, assigned to the first web application, as a source address to indicate that the initiation communication packet is transmitted by the first web application. The initiation communication packet may include an initiation payload including information to be received by the second user device. The first web application may transmit the initiation communication packet to the first meshnet application for transmission via the meshnet connection.

Based at least in part on receiving the initiation communication packet, the first meshnet application may analyze the initiation header. Based at least in part on the indicated source address, first meshnet application may determine that the initiation communication packet is transmitted by the first web application. Based at least in part on the indicated destination address, the first meshnet application may determine that the initiation communication packet is to be transmitted to the second user device via the meshnet connection. In this case, the first meshnet application may utilize the operating system to modify the initiation communication packet to indicate the first meshnet IP address as the source address.

Further, the meshnet application may transmit the modified initiation communication packet over the meshnet connection between the first user device and the second user device. In some aspects, prior to transmitting the modified initiation communication packet, the first meshnet application may encrypt the initiation communication packet based at least in part on utilizing the cryptographic key (e.g., block 350) negotiated between the first user device and the second user device.

Based at least in part on transmitting the modified initiation communication packet, the first meshnet application may receive a response communication packet from the second user device. In some aspects, the response communication packet may be encrypted based at least in part on utilizing the cryptographic key (e.g., block 350) negotiated between the first user device and the second user device. In some aspects, the response communication packet may be received within a given duration of time (e.g., 60 seconds, 120 seconds, 300 seconds, etc.) after transmitting the modified initiation communication packet, thereby indicating that the response communication packet is received in response to transmitting the modified initiation communication packet.

Based at least in part on decrypting the encrypted response communication packet, the first meshnet application may determine a response header indicating the first meshnet IP address as the destination address and the second meshnet IP address as the source address. The first meshnet application may also determine a response payload including information to be received by the first web application. In some aspects, the first meshnet application may determine that the response communication packet is to be provided to the first web application based at least in part on receiving the response communication packet within the given duration of time. In some aspects, the first meshnet application may determine that the response communication packet is to be provided to the first web application based at least in part on a destination port number, assigned to the first web application by the operating system, indicated in the response header.

In this case, the first meshnet application may modify the response communication packet to indicate the first meshnet IP address as the source address and the designated IP address as the destination address. The first meshnet application may transmit the modified response communication packet to the first web application based at least in part on utilizing the operating system.

In a similar and/or analogous manner as discussed above with respect to the first meshnet application enabling the first web application to communicate with the second user device, the present disclosure contemplates any meshnet application enabling an associated third-party web application to communicate with any meshnet device in the mesh network. In this case, the meshnet application may perform the actions discussed above with respect to the first meshnet application.

In this way, a meshnet device may enable an associated third-party web application to determine a current meshnet IP address assigned to another meshnet device to enable the third-party web application to communicate with the other meshnet device without configuring and/or reconfiguring the third-party web application to store correlations between the meshnet devices and their respective meshnet IP addresses and/or without updating the stored correlations. As a result, efficient utilization of user device resources (e.g., processing resources, memory resources, power consumption resources, battery life, or the like) and mesh network resources (computational resources, network bandwidth, management resources, processing resources, memory resources, or the like) for performing suitable tasks associated with the mesh network may be enabled.

As indicated above, FIG. 3 is provided as an example. Other examples may differ from what is described with regard to FIG. 3.

FIG. 4 is an illustration of an example process 400 associated with optimizing communication between meshnet devices in a mesh network, according to various aspects of the present disclosure. In some aspects, the process 400 may be performed by a memory and/or a processor/controller (e.g., processing unit 116, processor 720) associated with a user device/meshnet device (e.g., user device 102) running a meshnet application (e.g., meshnet application 114). As shown by reference numeral 410, process 400 may include transmitting, by the first meshnet device to a third-party application installed on the first meshnet device, an association between the second meshnet device and a unique identifier that identifies the second meshnet device. For instance, a first device may utilize an associated communication interface (e.g., communication interface 770) with the associated memory and/or processor to transmit, to a third-party application installed on the first meshnet device, an association between the second meshnet device and a unique identifier that identifies the second meshnet device, as discussed elsewhere herein.

As shown by reference numeral 420, process 400 may include receiving, by the first meshnet device from the third-party application, a query for a meshnet internet protocol (IP) address assigned to the second meshnet device, the query including the unique identifier that identifies the second meshnet device. For instance, the first device may utilize the associated communication interface, memory, and/or processor to receive, from the third-party application, a query for a meshnet internet protocol (IP) address assigned to the second meshnet device, the query including the unique identifier that identifies the second meshnet device, as discussed elsewhere herein.

As shown by reference numeral 430, process 400 may include transmitting, by the first meshnet device to the third-party application based at least in part on receiving the query, the meshnet IP address assigned to the second meshnet device. For instance, a first device may utilize the associated communication interface, memory, and/or processor to transmit, to the third-party application based at least in part on receiving the query, the meshnet IP address assigned to the second meshnet device, as discussed elsewhere herein.

As shown by reference numeral 440, process 400 may include receiving, by the first meshnet device from the third-party application based at least in part on transmitting the meshnet IP address, a communication packet to be transmitted to the second meshnet device, the communication packet indicating the meshnet IP address as a destination address. For instance, the first device may utilize the associated communication interface, memory, and/or processor to receive, from the third-party application based at least in part on transmitting the meshnet IP address, a communication packet to be transmitted to the second meshnet device, the communication packet indicating the meshnet IP address as a destination address, as discussed elsewhere herein.

As shown by reference numeral 450, process 400 may include transmitting, by the first meshnet device, the communication packet to the second meshnet device via a meshnet connection between the first meshnet device and the second meshnet device. For instance, a first device may utilize the associated communication interface, memory, and/or processor to transmit the communication packet to the second meshnet device via a meshnet connection between the first meshnet device and the second meshnet device, as discussed elsewhere herein Process 400 may include additional aspects, such as any single aspect or any combination of aspects described below and/or in connection with one or more other processes described elsewhere herein.

In a first aspect, process 400 may include receiving, by the first meshnet device from a meshnet infrastructure device, the meshnet IP address assigned to the second meshnet device and the unique identifier that identifies the second meshnet device.

In a second aspect, alone or in combination with the first aspect, process 400 may include storing, by the first meshnet device, a correlation between the meshnet IP address assigned to the second meshnet device and the unique identifier that identifies the second meshnet device.

In a third aspect, alone or in combination with the first through second aspects, in process 400, transmitting the communication packet includes modifying the communication packet to indicate the first meshnet device as a source device.

In a fourth aspect, alone or in combination with the first through third aspects, in process 400, transmitting the communication packet includes encrypting the communication packet based at least in part on utilizing a cryptographic key specific to the meshnet connection.

In a fifth aspect, alone or in combination with the first through fourth aspects, in process 400, transmitting the communication packet includes transmitting an encrypted communication packet via the meshnet connection between the first meshnet device and the second meshnet device.

In a sixth aspect, alone or in combination with the first through fifth aspects, in process 400, transmitting the meshnet IP address includes transmitting a current meshnet IP address currently assigned to the second meshnet device.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with optimizing communication between meshnet devices in a mesh network, according to various aspects of the present disclosure. In some aspects, the process 500 may be performed by a memory and/or a processor/controller (e.g., processing unit 116, processor 720) associated with a user device/meshnet device (e.g., user device 102) running a meshnet application (e.g., meshnet application 114). As shown by reference numeral 510, process 500 may include receiving, by the first meshnet device from a third-party application installed on the first meshnet device, an initiation packet including information to be received by the second meshnet device, the initiation packet indicating a meshnet internet protocol (IP) address assigned to the second meshnet device as a destination address. For instance, the first device may utilize an associated communication interface (e.g., communication interface 770) with the associated memory and/or processor to receive, from a third-party application installed on the first meshnet device, an initiation packet including information to be received by the second meshnet device, the initiation packet indicating a meshnet internet protocol (IP) address assigned to the second meshnet device as a destination address, as discussed elsewhere herein.

As shown by reference numeral 520, process 500 may include transmitting, by the first meshnet device via a meshnet connection between the first meshnet device and the second meshnet device, the initiation packet to the second meshnet device. For instance, the first device may utilize the associated communication interface, memory, and/or processor to transmit, via a meshnet connection between the first meshnet device and the second meshnet device, the initiation packet to the second meshnet device, as discussed elsewhere herein.

As shown by reference numeral 530, process 500 may include receiving, by the first meshnet device via the meshnet connection and based at least in part on transmitting the initiation packet, a response packet from the second meshnet device, the response packet including information to be received by the third-party application. For instance, the user device may utilize the associated communication interface, memory, and/or processor to receive, via the meshnet connection and based at least in part on transmitting the initiation packet, a response packet from the second meshnet device, the response packet including information to be received by the third-party application, as discussed elsewhere herein.

As shown by reference numeral 540, process 500 may include transmitting, by the first meshnet device, the response packet to the third-party application. For instance, the first device may utilize the associated communication interface, memory, and/or processor to transmit the response packet to the third-party application, as discussed elsewhere herein.

Process 500 may include additional aspects, such as any single aspect or any combination of aspects described below and/or in connection with one or more other processes described elsewhere herein.

In a first aspect, in process 500, transmitting the initiation packet includes modifying the initiation packet to indicate a meshnet IP address assigned to the first meshnet device as a source address.

In a second aspect, alone or in combination with the first aspect, in process 500, transmitting the initiation packet includes encrypting the initiation packet based at least in part on utilizing a cryptographic key associated with the meshnet connection In a third aspect, alone or in combination with the first through second aspects, in process 500, receiving the response packet includes receiving an encrypted response packet and decrypting the encrypted response packet based at least in part on utilizing a cryptographic key associated with the meshnet connection.

In a fourth aspect, alone or in combination with the first through third aspects, in process 500, receiving the response packet includes receiving the response packet within a given duration of time after transmitting the initiation packet.

In a fifth aspect, alone or in combination with the first through fourth aspects, process 500 may include transmitting, by the first meshnet device, the meshnet IP address currently assigned to the second meshnet device based at least in part on receiving a query from the third-party application.

In a sixth aspect, alone or in combination with the first through fifth aspects, process 500 may include transmitting, by the first meshnet device, an update message to the third-party application indicating a new meshnet IP address based at least in part on determining a change in the meshnet IP address assigned to the second meshnet device.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with optimizing communication between meshnet devices in a mesh network, according to various aspects of the present disclosure. In some aspects, the process 600 may be performed by a memory and/or a processor/controller (e.g., processing unit 110, processor 720) associated with an infrastructure device (e.g., MSP control infrastructure 104) capable of configuring a meshnet application that is executed on a meshnet device. As shown by reference numeral 610, process 600 may include configuring the first meshnet device to transmit, to a third-party application installed on the first meshnet device, an association between the second meshnet device and a unique identifier that identifies the second meshnet device. For instance, the infrastructure device may utilize the associated memory and/or processor to configure the first meshnet device to transmit, to a third-party application installed on the first meshnet device, an association between the second meshnet device and a unique identifier that identifies the second meshnet device, as discussed elsewhere herein.

As shown by reference numeral 620, process 600 may include configuring the first meshnet device to receive, from the third-party application, a query for a meshnet internet protocol (IP) address assigned to the second meshnet device, the query including the unique identifier that identifies the second meshnet device. For instance, the infrastructure device may utilize the associated memory and/or processor to configure the first meshnet device to receive, from the third-party application, a query for a meshnet internet protocol (IP) address assigned to the second meshnet device, the query including the unique identifier that identifies the second meshnet device, as discussed elsewhere herein.

As shown by reference numeral 630, process 600 may include configuring the first meshnet device to transmit, to the third-party application based at least in part on receiving the query, the meshnet IP address assigned to the second meshnet device. For instance, the infrastructure device may utilize the associated memory and/or processor to configure the first meshnet device to transmit, to the third-party application based at least in part on receiving the query, the meshnet IP address assigned to the second meshnet device, as discussed elsewhere herein.

As shown by reference numeral 640, process 600 may include configuring the first meshnet device to receive, from the third-party application based at least in part on transmitting the meshnet IP address, a communication packet to be transmitted to the second meshnet device, the communication packet indicating the meshnet IP address as a destination address. For instance, the infrastructure device may utilize the associated memory and/or processor to configure the first meshnet device to receive, from the third-party application based at least in part on transmitting the meshnet IP address, a communication packet to be transmitted to the second meshnet device, the communication packet indicating the meshnet IP address as a destination address, as discussed elsewhere herein.

As shown by reference numeral 650, process 600 may include configuring the first meshnet device to transmit the communication packet to the second meshnet device via a meshnet connection between the first meshnet device and the second meshnet device. For instance, the infrastructure device may utilize the associated memory and/or processor to configure the first meshnet device to transmit the communication packet to the second meshnet device via a meshnet connection between the first meshnet device and the second meshnet device, as discussed elsewhere herein.

Process 600 may include additional aspects, such as any single aspect or any combination of aspects described below and/or in connection with one or more other processes described elsewhere herein.

In a first aspect, process 600 may include configuring the first meshnet device to receive, from a meshnet infrastructure device, the meshnet IP address assigned to the second meshnet device and the unique identifier that identifies the second meshnet device.

In a second aspect, alone or in combination with the first aspect, process 600 may include configuring the first meshnet device to store a correlation between the meshnet IP address assigned to the second meshnet device and the unique identifier that identifies the second meshnet device.

In a third aspect, alone or in combination with the first through second aspects, in process 600, configuring the first meshnet device to transmit the communication packet includes configuring the first meshnet device to modify the communication packet to indicate the first meshnet device as a source device.

In a fourth aspect, alone or in combination with the first through third aspects, in process 600, configuring the first meshnet device to transmit the communication packet includes configuring the first meshnet device to encrypt the communication packet based at least in part on utilizing a cryptographic key specific to the meshnet connection.

In a fifth aspect, alone or in combination with the first through fourth aspects, in process 600, configuring the first meshnet device to transmit the communication packet includes configuring the first meshnet device to transmit an encrypted communication packet via the meshnet connection between the first meshnet device and the second meshnet device.

In a sixth aspect, alone or in combination with the first through fifth aspects, in process 600, configuring the first meshnet device to transmit the meshnet IP address includes configuring the first meshnet device to transmit a current meshnet IP address currently assigned to the second meshnet device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

In some aspects, the present disclosure contemplates configuring the first meshnet device to receive, from a third-party application installed on the first meshnet device, an initiation packet including information to be received by the second meshnet device, the initiation packet indicating a meshnet internet protocol (IP) address assigned to the second meshnet device as a destination address; configuring the first meshnet device to transmit, via a meshnet connection between the first meshnet device and the second meshnet device, the initiation packet to the second meshnet device; configuring the first meshnet device to receive, via the meshnet connection and based at least in part on transmitting the initiation packet, a response packet from the second meshnet device, the response packet including information to be received by the third-party application; and configuring the first meshnet device to transmit the response packet to the third-party application.

FIG. 7 is an illustration of example devices 700 associated with optimizing communication between meshnet devices in a mesh network, according to various aspects of the present disclosure. In some aspects, the example devices 700 may form part of or implement the systems, servers, environments, infrastructures, components, devices, or the like described elsewhere herein (e.g., MSP control infrastructure, user device, etc.) and may be used to perform example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first meshnet device in communication with a second meshnet device in a mesh network, the first meshnet device comprising:
    a memory; and
    a processor communicatively coupled to the memory, the memory and the processor being configured to:
        receive, from a third-party application installed on the first meshnet device, an initiation packet including information to be received by the second meshnet device, the initiation packet indicating a meshnet internet protocol (IP) address assigned to the second meshnet device as a destination address;

transmit, via a meshnet connection between the first meshnet device and the second meshnet device, the initiation packet to the second meshnet device;

receive, via the meshnet connection and based at least in part on transmitting the initiation packet, a response packet from the second meshnet device, the response packet including information to be received by the third-party application; and transmit the response packet to the third-party application.

2. The first meshnet device of claim 1, wherein, to transmit the initiation packet, the memory and the processor are configured to modify the initiation packet to indicate a meshnet IP address assigned to the first meshnet device as a source address.

3. The first meshnet device of claim 1, wherein, to transmit the initiation packet, the memory and the processor are configured to encrypt the initiation packet based at least in part on utilizing a cryptographic key associated with the meshnet connection.

4. The first meshnet device of claim 1, wherein, to receive the response packet, the memory and the processor are configured to receive an encrypted response packet and to decrypt the encrypted response packet based at least in part on utilizing a cryptographic key associated with the meshnet connection.

5. The first meshnet device of claim 1, wherein, to receive the response packet, the memory and the processor are configured to receive the response packet within a given duration of time after transmitting the initiation packet.

6. The first meshnet device of claim 1, wherein the memory and the processor are configured to:

transmit the meshnet IP address currently assigned to the second meshnet device based at least in part on receiving a query from the third-party application.

7. The first meshnet device of claim 1, wherein the memory and the processor are configured to:

transmit an update message to the third-party application indicating a new meshnet IP address based at least in part on determining a change in the meshnet IP address assigned to the second meshnet device.

8. A method in a mesh network including a first meshnet device in communication with a second meshnet device, the method comprising:

receiving, by the first meshnet device from a third-party application installed on the first meshnet device, an initiation packet including information to be received by the second meshnet device, the initiation packet indicating a meshnet internet protocol (IP) address assigned to the second meshnet device as a destination address;

transmitting, by the first meshnet device via a meshnet connection between the first meshnet device and the second meshnet device, the initiation packet to the second meshnet device;

receiving, by the first meshnet device via the meshnet connection and based at least in part on transmitting the initiation packet, a response packet from the second meshnet device, the response packet including information to be received by the third-party application; and transmitting, by the first meshnet device, the response packet to the third-party application.

9. The method of claim 8, wherein transmitting the initiation packet includes modifying the initiation packet to indicate a meshnet IP address assigned to the first meshnet device as a source address.

10. The method of claim 8, wherein transmitting the initiation packet includes encrypting the initiation packet based at least in part on utilizing a cryptographic key associated with the meshnet connection.

11. The method of claim 8, wherein receiving the response packet includes receiving an encrypted response packet and decrypting the encrypted response packet based at least in part on utilizing a cryptographic key associated with the meshnet connection.

12. The method of claim 8, wherein receiving the response packet includes receiving the response packet within a given duration of time after transmitting the initiation packet.

13. The method of claim 8, further comprising:

transmitting, by the first meshnet device, the meshnet IP address currently assigned to the second meshnet device based at least in part on receiving a query from the third-party application.

14. The method of claim 8, further comprising:

transmitting, by the first meshnet device, an update message to the third-party application indicating a new meshnet IP address based at least in part on determining a change in the meshnet IP address assigned to the second meshnet device.

15. A non-transitory computer-readable medium configured to store instructions, which when executed by a processor associated with a first meshnet device in communication with a second meshnet device in a mesh network, configure the processor to:

receive, from a third-party application installed on the first meshnet device, an initiation packet including information to be received by the second meshnet device, the initiation packet indicating a meshnet internet protocol (IP) address assigned to the second meshnet device as a destination address;

transmit, via a meshnet connection between the first meshnet device and the second meshnet device, the initiation packet to the second meshnet device;

receive, via the meshnet connection and based at least in part on transmitting the initiation packet, a response packet from the second meshnet device, the response packet including information to be received by the third-party application; and transmit the response packet to the third-party application.

16. The non-transitory computer-readable medium of claim 15, wherein, to transmit the initiation packet, the processor is configured to modify the initiation packet to indicate a meshnet IP address assigned to the first meshnet device as a source address.

17. The non-transitory computer-readable medium of claim 15, wherein, to transmit the initiation packet, the processor is configured to encrypt the initiation packet based at least in part on utilizing a cryptographic key associated with the meshnet connection.

18. The non-transitory computer-readable medium of claim 15, wherein, to receive the response packet, the processor is configured to receive an encrypted response packet and to decrypt the encrypted response packet based at least in part on utilizing a cryptographic key associated with the meshnet connection.

19. The non-transitory computer-readable medium of claim 15, wherein, to receive the response packet, the processor is configured to receive the response packet within a given duration of time after transmitting the initiation packet.

20. The non-transitory computer-readable medium of claim 15, wherein the processor is configured to:
transmit the meshnet IP address currently assigned to the second meshnet device based at least in part on receiving a query from the third-party application.

* * * * *